United States Patent [19]

DeLeu et al.

[11] 4,421,498
[45] Dec. 20, 1983

[54] MODULAR SHEAVE

[75] Inventors: Robert P. DeLeu, Mishawaka; Robert G. Thompson, Osceola, both of Ind.

[73] Assignee: Reliance Electric Company, Mishawaka, Ind.

[21] Appl. No.: 263,301

[22] Filed: May 13, 1981

[51] Int. Cl.³ .............................................. F16H 55/36
[52] U.S. Cl. ...................................... 474/182; 474/33
[58] Field of Search ...................... 474/28, 29, 30, 31, 474/32, 33, 34, 170, 182, 183; 29/464, 460, 159.2; 164/108, 111

[56] References Cited

U.S. PATENT DOCUMENTS

| | | | |
|---|---|---|---|
| 2,402,743 | 6/1946 | Firth | 474/170 |
| 2,855,787 | 10/1958 | Kumro et al. | 474/33 |
| 3,349,470 | 10/1967 | Weglarz | 164/108 |
| 4,020,937 | 5/1977 | Winter | 29/463 |
| 4,122,586 | 10/1978 | Nothdurft | 29/463 |

FOREIGN PATENT DOCUMENTS

| | | | |
|---|---|---|---|
| 73321 | 11/1951 | Denmark | 474/33 |
| 1112581 | 11/1955 | France | 474/33 |

*Primary Examiner*—John E. Murtagh
*Assistant Examiner*—Andrew Joseph Rudy
*Attorney, Agent, or Firm*—Marmaduke A. Hobbs

[57] ABSTRACT

A modular V-belt sheave which, in a specific embodiment, has two end modules and a hub connected to at least one of the modules and may have one or more intermediate modules and the modules are secured together by a plurality of tying members extending through aligned holes in the modules, the members preferably consisting of cast metal, such as aluminum, with heads on the opposite ends of the elements. The members are cast into the aligned holes and, as the members cool, they contract, holding the modules firmly together. A hub may be used which preferably has a radial member seating between two of the modules and having a plurality of holes for alignment with the holes in the modules and for receiving the tying members so that the members will rigidly secure the modules to the radial member. The end modules are identical to one another and the intermediate modules are identical to one another, and each of the end modules has an annular ridge on the inner side and the intermediate modules have an annular ridge on one side and an annular groove on the other to permit interlocking of the modules with one another when they are assembled together and mounted on the radial member of the hub. Sheaves with different numbers of grooves can readily be produced with only two different types of modules and a single type of hub or radial member.

14 Claims, 6 Drawing Figures

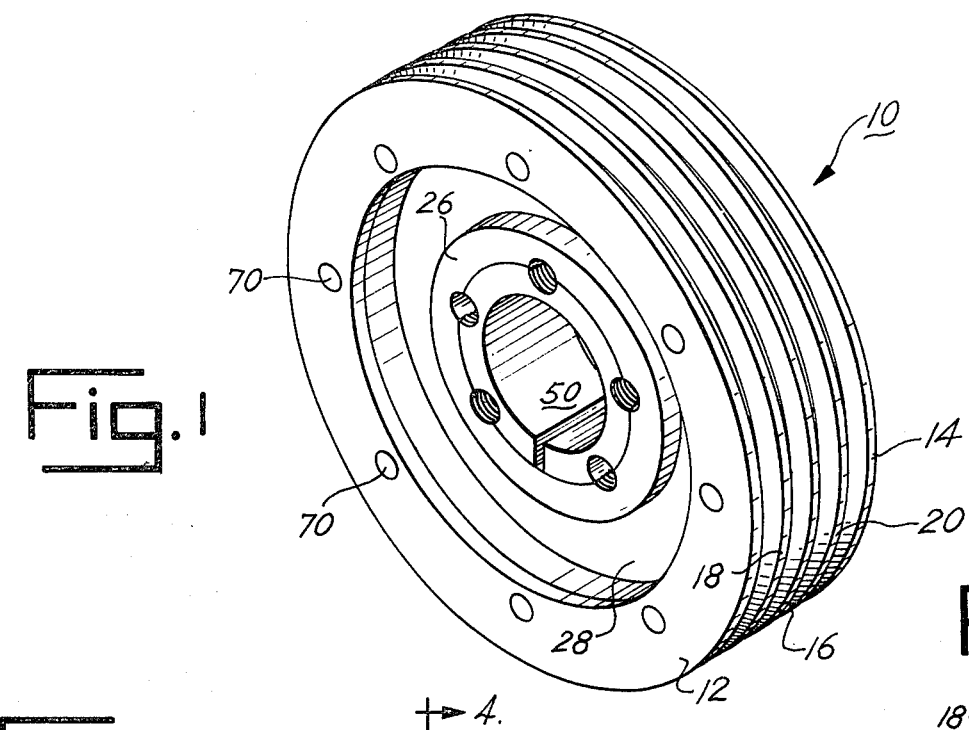
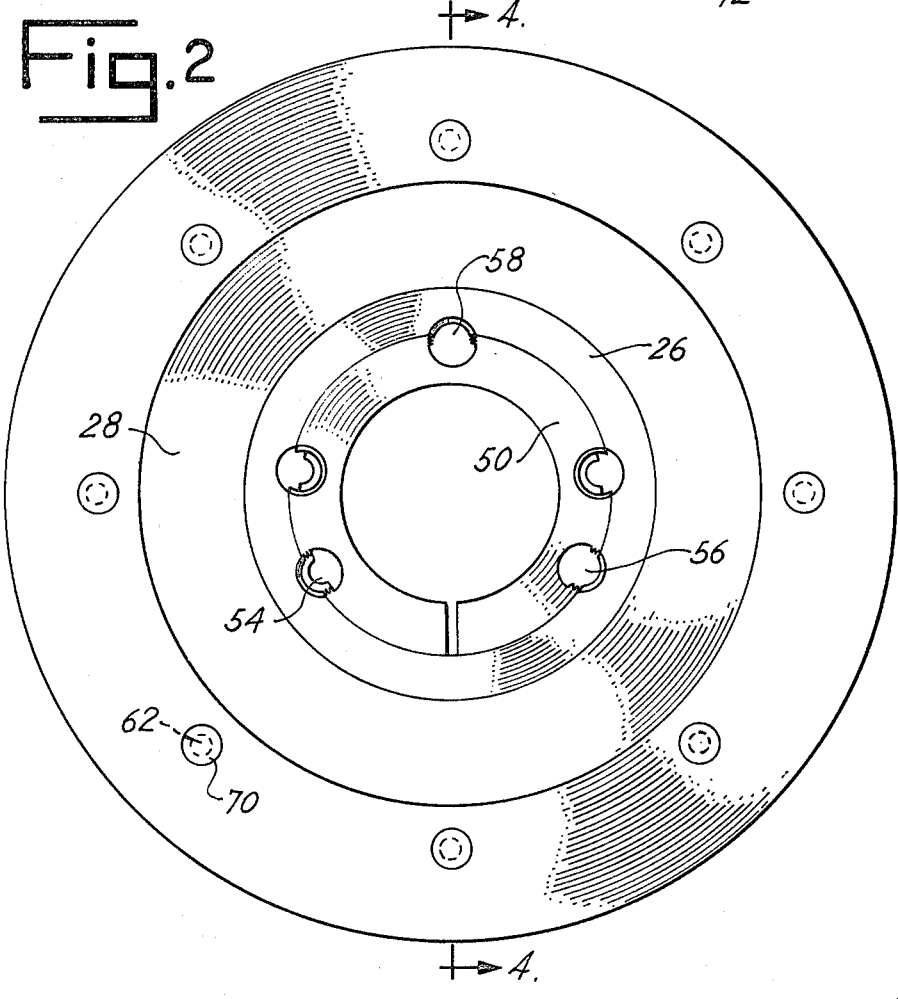
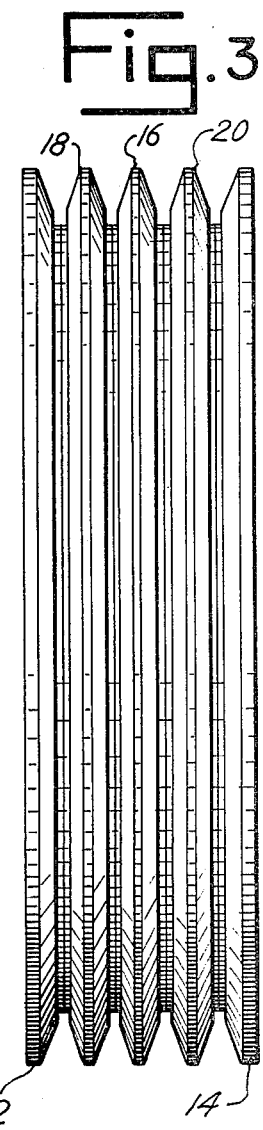

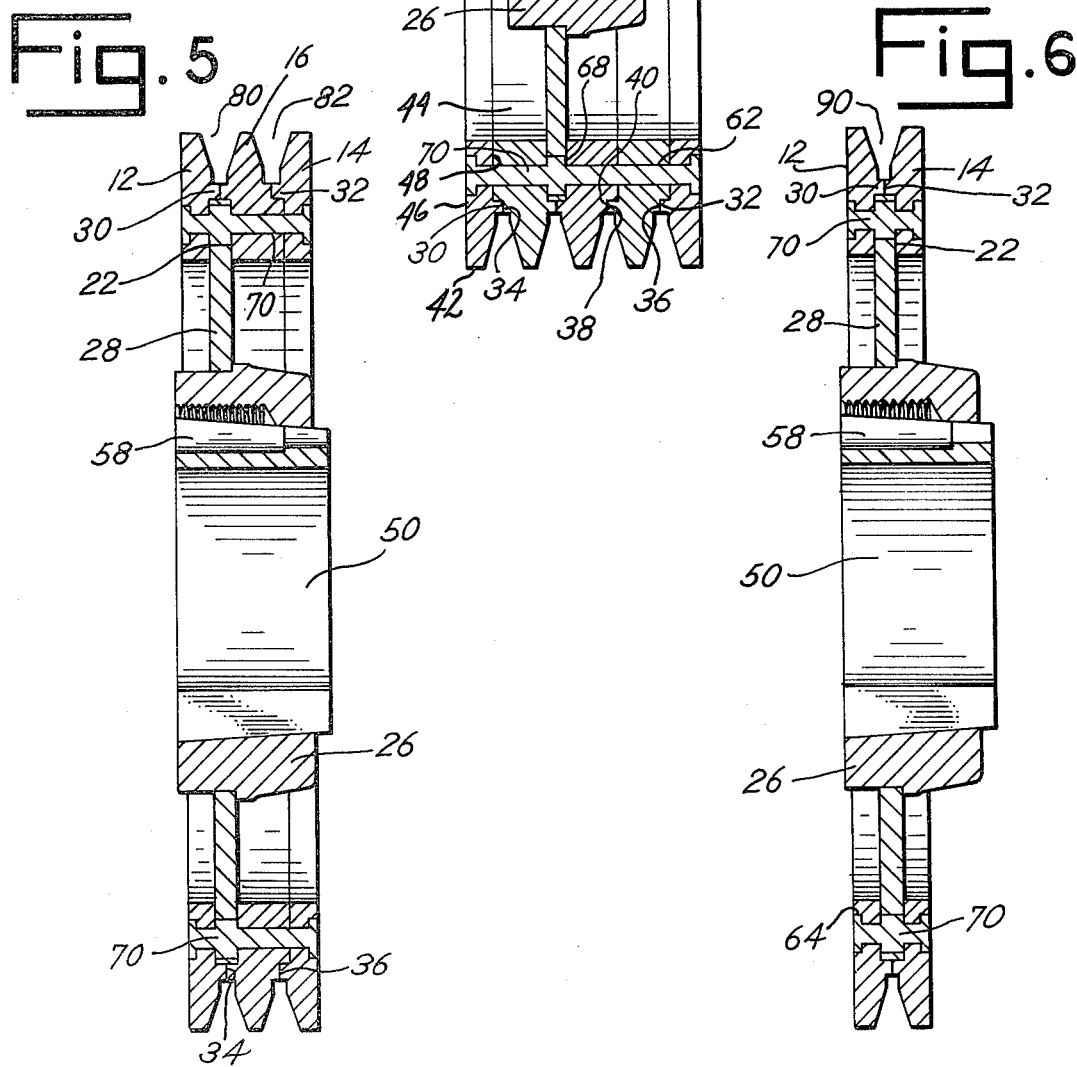

MODULAR SHEAVE

BACKGROUND OF THE INVENTION

The general practice used in the industry for fabricating and supplying V-belt type sheaves of single and multiple groove types, has consisted in producing the sheaves of the desired number of grooves for each specific size and type. The sheaves are produced by any one of several fabricating methods, including machining, stamping, spinning and die-casting, and are usually made in runs of sufficient numbers not only to supply the immediate customer's orders, but also to build up a substantial inventory for future orders. Each sheave type and size and number of belt grooves requires a separate mold, die and/or pattern, and each requires warehousing space for inventory storage regardless of the amount of sales or number of orders for the various sheaves. This practice entails maintaining a relatively large inventory of the various sheaves to satisfy customer requirements and, at the same time, an investment in and storage space for the molds, dies and/or patterns for the relatively large number of different sheave types and sizes. It is therefore one of the principal objects of the present invention to provide a modular sheave constructed of a few standard parts from which a variety of sheaves with different numbers of belt grooves can be constructed, and which, as a result, makes possible a substantial reduction in normal inventory, without sacrificing efficiency in meeting customer requirements. Another object of the invention is to provide a modular sheave, the parts of which can be readily fabricated from a small number of molds and/or dies, and which can be used from time to time to complete the final sheaves to meet customer requirements on size and number of belt grooves. Still another object of the invention is to provide a modular sheave which is simple in construction and convenient to assemble in fulfilling orders, and which is strong and capable of a long operating, service-free life.

SUMMARY OF THE INVENTION

The foregoing objects and other objects and advantages which will become apparent from the following description and accompanying drawings, are achieved by the present invention which consists of a V-belt type sheave constructed of identical end modules and, if the sheave is a multiple groove type, of one or more identical intermediate modules, depending upon the number of grooves in the final sheave. The modules are mounted on a radial member supported by a hub and are secured together and to the radial member by tying members extending through holes in the modules and radial member. The modules are initially placed in a stacked relationship in a hydraulic assembly press, and, while they are being held firmly together by the press, they are secured together by a suitable tying means, such as cast pins, rivets, bolts, screws or resistance welding. The tying members are preferably cast aluminum elements poured into aligned holes of the modules and radial member and permitted to cool. As the aluminum elements cool, they shrink, causing heads on the ends of the elements to hold the stacked modules securely together and to retain them firmly in a fixed position relative to one another as a rigid sheave structure. In addition to permitting the easy fabrication of sheaves with different numbers of grooves, the present modular sheave concept permits the selection of different sizes of hubs and types of bushings for mounting the sheaves on shafts, and reduces the number of parts, molds and dies required for the production of a relatively large number of sheaves with different numbers of grooves and sizes and types of hubs and bushings.

BRIEF DESCRIPTION OF THE DRAWINGS

FIG. 1 is a perspective view of a modular sheave embodying the present invention;

FIG. 2 is a side elevational view of the modular sheave shown in FIG. 1;

FIG. 3 is an edge elevational view of the modular sheave shown in FIG. 2;

FIG. 4 is a vertical cross sectional view of the modular sheave shown in the preceding figures, the section being taken on line 4—4 of FIG. 2, illustrating a sheave having four belt grooves;

FIG. 5 is a vertical cross sectional view of a modular sheave, similar to that shown in FIG. 4, except that in this embodiment only two belt grooves are provided; and FIG. 6 is a vertical cross sectional view of a modular sheave similar to those shown in FIGS. 4 and 5 but constructed to have a single belt groove.

DESCRIPTION OF THE PREFERRED EMBODIMENT

Referring more specifically to the drawings, numeral 10 indicates generally a modular sheave embodying the present invention, the sheaves illustrated in the various figures in the drawings representing variations of the modular sheave from one belt groove to four belt grooves. The number of grooves can be varied within limits, using the same modules to produce different numbers of grooves, and the modules can be used in conjunction with different sizes and types of hubs and bushings, depending upon the equipment on which the sheaves will be mounted and the types of drives with which the sheaves will be used. Different diameter modules and different designs may be employed for the purpose of providing the desired sheave and groove size and configuration.

The sheaves shown in the embodiments of FIGS. 1 through 4 include two end modules 12 and 14 and a center module 16, and two lateral modules 18 and 20. The center and two lateral modules are identical to one another; however, they are so constructed and arranged that when assembled in a sheave, the two lateral modules are reversed and the center module is so assembled as to provide a groove or space 22 for receiving a periphery of the hub assembly. The hub assembly indicated generally by numeral 24, has an annular body 26 and a radially extending, disc-shaped member 28 rigidly connected to body 26 and extending into the peripheral groove or space 22 between modules 16 and 18. End modules 12 and 14 have annular ribs 30 and 32, respectively, for seating in annular grooves 34 and 36, respectively. Thus annular rib and groove 30 and 34 interlock with one another and annular rib and groove 32 and 36 interlock with one another to form a firm structure for maintaining the two modules 12 and 18 in axial alignment and modules 14 and 20 in axial alignment. Lateral module 20 has annular rib 38 for seating in annular groove 40 of center module 16 and thereby interlocking the two modules in axial alignment. Each of the end modules 12 and 14 has an outer wall 42, an inner wall 44 and side walls 46 and 48, the inner wall being spaced radially outwardly from the outer diameter or surface of body 26 of hub 24.

In the drawings, a tapered bushing 50 is shown for securing the sheave to a shaft. The type of bushing is of well known construction such as, for example, that disclosed in U.S. Pat. No. 2,402,743. This particular bushing is secured to the shaft and to the hub by seating on annular tapered surface 52 of the hub as screws inserted in bores 54, 56 and 58 are tightened in the threads 60 of each bore, causing the screw to seat on the end 61 of the respective bore and force the bushing into firm contact with tapered surface 52. This causes the split bushing to grip the hub and the shaft on which the sheave is mounted. While the tapered bushing is illustrated, other types of shaft mounting means may be used with the present modular sheave construction. Member 28 is secured by welding or other suitable means to the periphery of hub 26 and is assembled in space 22 between modules 16 and 18 when the modules are assembled to form the sheave.

The modules are all provided with a plurality of holes 62 which extend therethrough in parallel relationship with the axis of the modules, and the holes in end modules 12 and 14 have enlarged outer ends 64 and 66. Member 28 of the hub also has holes of the same number and spacing as the holes in the modules, and the holes in member 28 are preferably somewhat larger than the holes in the various modules. After the modules have been stacked and the hub with member 28 inserted in the stack of modules as illustrated in FIG. 4, the modules and member 28 are pressed firmly together into intimate contact by a hydraulic assembly press, and tie members such as pins 70 are inserted in the holes. In the preferred embodiment, the tie members consist of a cast aluminum or other suitable metal poured while molten into the holes where they conform to the shape of the holes in the modules, including the enlarged hole in member 28 and the recesses 64 and 66 of the end modules. As the castings forming the tie members cool, the tie members shrink and the heads in recesses 64 and 66 hold the stack of modules firmly together as a rigid sheave structure, with the hub being held firmly in place between modules 16 and 18. The modules may be constructed of steel, aluminum or any other suitable material and are normally fully machined to final dimensions prior to the assembly of the modules into the final sheave, so that after the modules have been assembled and secured together by the plurality of tie members 70, the sheaves are finished. Instead of pins 70 of cast aluminum being used as the tying means, the modules and radial member 28 can be secured firmly together by other tying means, such as, for example, by resistance welding or by securing them with rivets, screws or bolts.

Since, in the embodiment illustrated in FIG. 4, the center and lateral modules 16, 18 and 20 are identical in construction and design, any number of grooves can be made by the stacking of the modules on one side of the hub member 28 facing in one direction and the modules on the other side facing in the opposite direction. As shown in FIG. 4, modules 16 and 20 are in one position and module 18 is in the opposite position, thus providing the groove or space 22 for receiving radial member 28, and providing an interlocking relationship between end module 14, lateral module 20 and center module 16, and a similar interlocking relationship between end module 12 and lateral module 18. Each of the intermediate modules, i.e. center and lateral modules, is provided with an annular rib 38 on one side and a groove 40 on the opposite side. However, in order to explain more clearly the construction of the embodiment of FIG. 4, the ribs and grooves of the center and lateral modules have been given different numerals notwithstanding the fact that the three modules are identical for each pulley size and type. Likewise, the two end modules are identical to one another, with annular ribs 30 and 32 on modules 12 and 14, respectively, on the inner side for seating in the grooves of the adjacent lateral modules.

In the embodiment illustrated in FIG. 5, the two grooves 80 and 82 are constructed by using end modules 12 and 14 and center module 16. The center module 16 in this embodiment is the same as the center module in the embodiment of FIG. 4, and the two end modules 12 and 14 are the same as the respective modules of FIG. 4. Rib 30 of end module 12 and rib 34 of center module 16 seat against one another and provide the space 22 for receiving the periphery of radial member 28 of the hub assembly. The annular rib 32 of end module 14 seats in annular groove 30 of the center module, thus providing the same interlocking relationship as that illustrated in FIG. 4. The two end modules 12 and 14 and center module 16 are secured together by the plurality of tying members 70, when the members consisting of cast aluminum are poured into the aligned holes of the modules and hub member 28, and upon cooling, the cast elements shrink and urge heads 72 and 74 inwardly to hold the three modules firmly together as a rigid sheave structure after the sheave has been removed from the assembly press. Since the two end modules, the center module and hub assembly are identical to those used in the sheave of FIG. 4, like numerals have been given to like parts. While the hub illustrated in FIG. 5 is the same type of hub illustrated at numeral 50 in FIG. 4, different types of hubs and shaft mounting means may be used to satisfy requirements and customers' preferences. Further, in this embodiment, as well as in the other embodiments disclosed herein, the modules may be assembled with only radial member 28 which is then secured by bolts, screws or other securing means directly to a rotatable member on the driven or driving equipment.

In the embodiment of FIG. 6, a pulley with a single groove 90 is illustrated. In the construction of the pulley of this figure, two end modules 12 and 14 are placed together with the ribs 30 and 32 seated against one another to form groove or space 22 for receiving the periphery of radial member 28 of the hub assembly. The two end modules are secured together by a plurality of cast aluminum elements 70 extending through holes in the modules and flaring out at the outer ends in recesses 64 and 66 to form heads 72 and 74. When the poured aluminum cools and shrinks, the two modules 12 and 14 are held firmly together as a rigid sheave construction. The hub here again is illustrated as having the tapered bushing type as in the embodiments of FIGS. 4 and 5, but the sheaves can be mounted on shafts using other types of mounting means.

It is seen from the foregoing description that a variety of sheaves may be produced from three or four modules consisting of the identical end modules, intermediate modules and hub assembly secured together with members 70. Thus, most of the sheave can be formed by the use of four parts in combination with the tie members or elements 70. While the tie members 70 are shown herein as individual members, they may be cast with interconnecting elements so that the tie members, in effect, become a single unit. This type of structure would not normally be used; however, under certain circumstances the casting operation may be performed more efficiently by pouring the members in a single operation than by pouring the individual tie elements separately. By the arrangement of having only four separate parts in stock to form a variety of different sheaves, it is possible to maintain efficient customer service with a relatively small inventory, as well as save substantial expense in tooling costs.

While several embodiments of the present modular sheave have been described in detail herein, various changes and modifications may be made without departing from the scope of the invention.

We claim:

1. A modular V-belt sheave comprising two end modules of similar shape and construction, each module having a plurality of holes for alignment with corresponding holes in the other end module and having at least one angular peripheral surface for engagement with a belt, at least one intermediate module having a plurality of holes for alignment with the holes in said end modules and having two angular annular peripheral surfaces for engagement with belts on opposite sides thereof, a hub having a cylindrical body with an outer surface defined by an outer diameter and a radial means joined to said outer surface of said body and extending outwardly therefrom for connection with at least one of said modules, said end modules being defined by an outer wall, an inner wall and a pair of side walls, said inner wall having a diameter sufficiently larger than the outer diameter of said body of said hub wherein the inner wall is radially spaced outwardly of said outer surface of said body and tying means having members extending through the holes in said modules for securing said modules together in axial alignment with one another and in supported relationship with said radial means of said hub.

2. A modular V-belt sheave as defined in claim 1 in which said radial means is adapted to seat between two of said modules and has a plurality of holes near the periphery thereof for alignment with the holes in said module for receiving said tying means.

3. A modular V-belt sheave as defined in claim 2 in which said intermediate module has an annular rib on one side near the bottom of the angular peripheral surface and a recess on the opposite side near the bottom of the other annular peripheral surface for receiving an annular rib from another intermediate module or from the adjacent end module.

4. A modular V-belt sheave as defined in claim 1 in which said end modules are identical to one another with each module having an annular rib on the inwardly facing side thereof.

5. A modular V-belt sheave as defined in claim 1 in which said intermediate module has an annular rib on one side near the bottom of the angular peripheral surface and a recess on the opposite side near the bottom of the other annular peripheral surface for receiving an annular rib from another intermediate module or from the adjacent end module.

6. A modular V-belt sheave as defined in claim 5 in which said radial means is adapted to seat between two of said modules and has a plurality of holes near the periphery thereof for alignment with the holes in said module for receiving said tying means.

7. A modular V-belt sheave as defined in claim 6 in which said tying means includes individual members of cast metal disposed in said holes and having heads on opposite ends for securing the modules and radial means in rigid position relative to one another.

8. A modular V-belt sheave as defined in claim 1 in which said tying means includes individual members of cast aluminum disposed in said holes and having means on opposite ends for securing the modules and radial means in rigid position relative to one another.

9. A modular V-belt sheave comprising two end modules of similar shape and construction, each module having at least one angular, annular peripheral surface for engagement with a belt, a hub having a cylindrical body with an outer surface defined by an outer diameter and radial means extending outwardly from said outer surface of said body and being connected with at least one of said modules, said end modules being defined by an outer wall, an inner wall, and a pair of side walls, said inner wall having a diameter sufficiently larger than the outer diameter of said body of said hub wherein the inner wall is radially spaced outwardly of said outer surface of said body, and tying means securing said modules and radial means together in axial alignment with one another and in supported relationship with said radial means.

10. A modular V-belt sheave as defined in claim 9 in which said end modules are identical to one another with each having an annular rib on the inwardly facing side thereof.

11. A modular V-belt sheave as defined in claim 9 in which said tying means includes individual elements of cast metal disposed in a plurality of aligned holes in said modules and having heads on opposite ends for securing the modules and radial means in rigid position relative to one another.

12. A modular V-belt sheave as defined in claim 11 in which said radial means is adapted to seat between said modules and has a plurality of holes disposed near the periphery thereof for alignment with the holes in said module and being larger in diameter than the holes in said modules.

13. A modular V-belt sheave as defined in claim 9 in which said tying means includes pins disposed in a plurality of aligned holes in said modules.

14. A modular V-belt sheave as defined in claim 9 in which said tying means consists of resistance welds between the several modules.

* * * * *